Dec. 7, 1971   F. A. HITZEROTH ET AL   3,625,714
TOASTER BASE WITH INTEGRAL BAFFLE PLATES
Filed Jan. 12, 1970   2 Sheets-Sheet 1
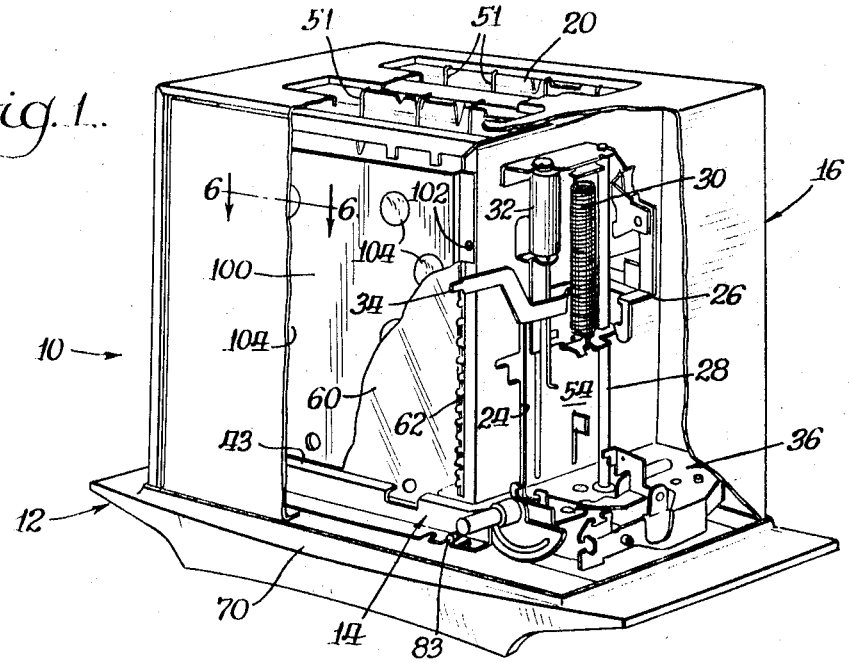
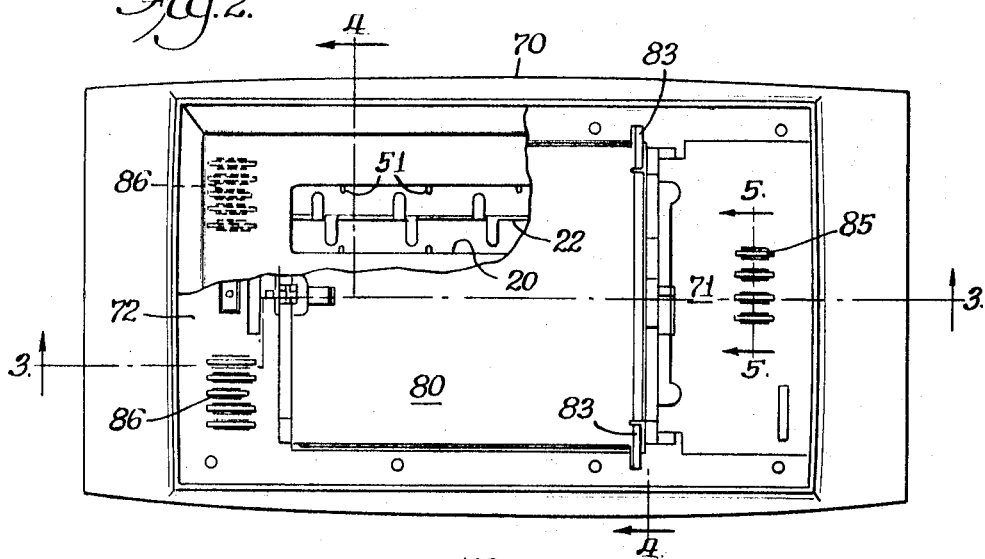
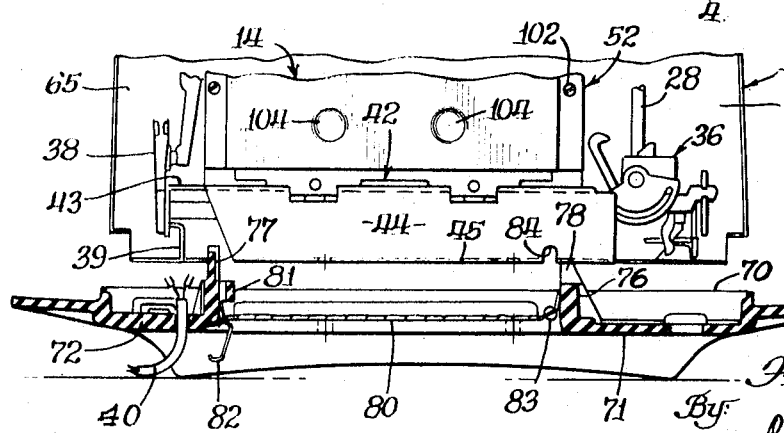
Inventors:
David B. Walitzer
Franklin C. Hitzeroth
By Charles F. Lind
Atty.

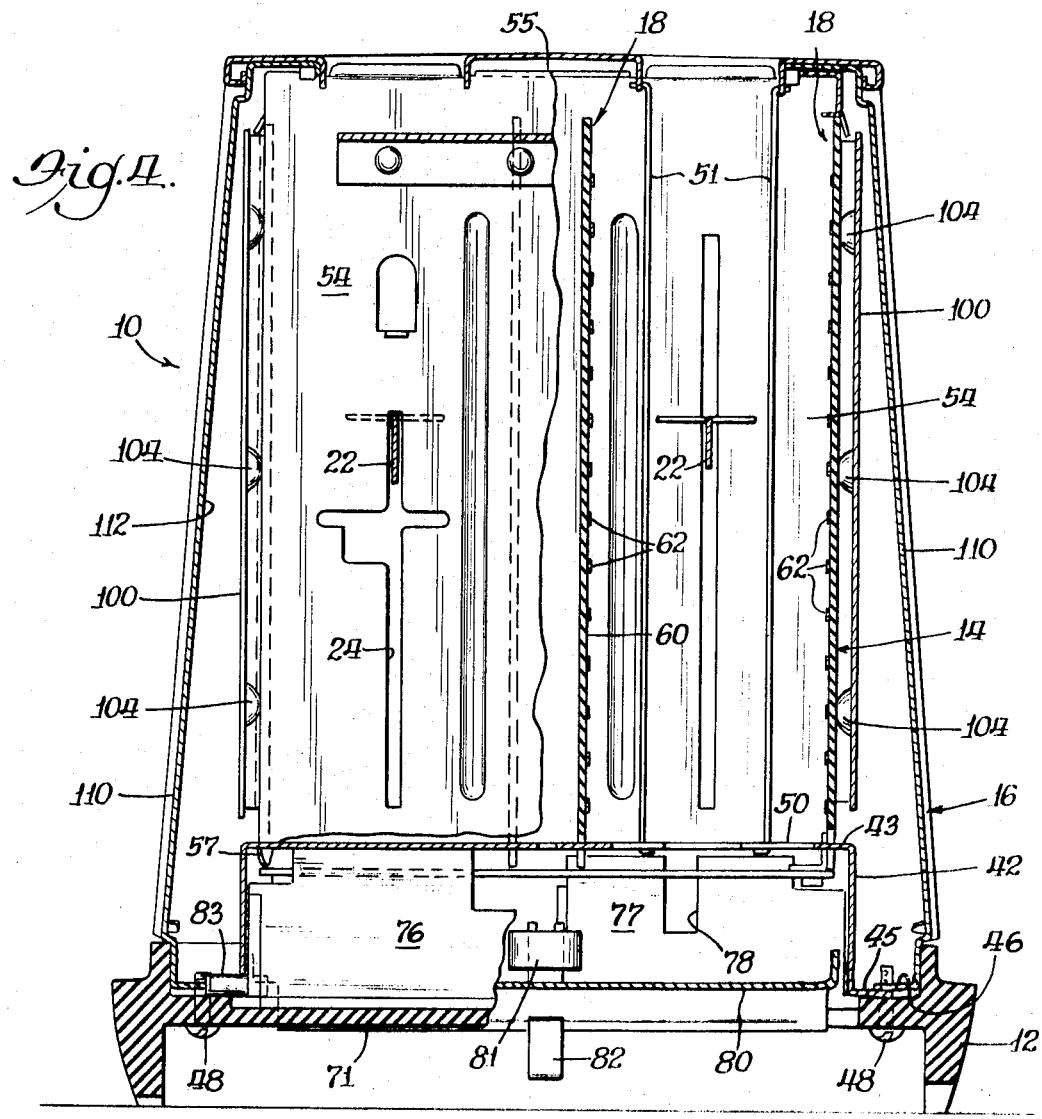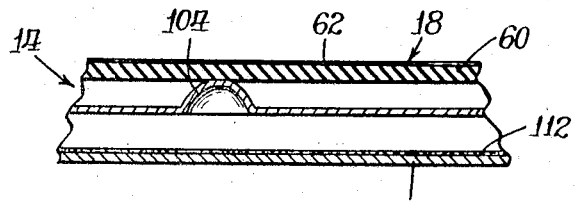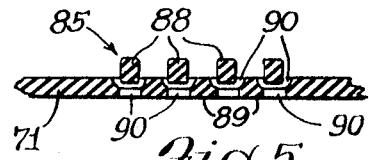

United States Patent Office 3,625,714
Patented Dec. 7, 1971

3,625,714
TOASTER BASE WITH INTEGRAL
BAFFLE PLATES
Franklin C. Hitzeroth, Centerville, and David B. Walitzer, Appanoose County, Iowa, assignors to McGraw-Edison Company, Elgin, Ill.
Filed Jan. 12, 1970, Ser. No. 2,139
Int. Cl. A47j 37/08
U.S. Cl. 99—389      7 Claims

ABSTRACT OF THE DISCLOSURE

A toaster having an insulating phenolic base to which the toaster chassis and case are secured, the base including integral upstanding baffles which serve in part to separate the toasting chambers from end compartments formed between the case and chassis, and further having plates selectively secured to the chassis between the heating elements and the inner face of the case for rendering immaterial the case construction, be it of a highly polished chrome or a duller finished porcelain material.

---

Typically, a toasted includes a metal chassis having one or more pairs of heating elements each defining therebetween a heating chamber for receipt of bread to be toasted, and a protective metal case is over the chassis. The chassis and case are mounted on a base of an insulating material, such as phenolic, and the base frequently has extensions that serve as the toaster handles. A most common chassis has a U-shaped lower platform underlying the heating chambers, and separate L-shaped elements are secured to the base to close the opposite open ends of the platform. This isolates the heating chambers from endward compartments defined between the chassis and the case, and the electrical controls and wire connections, timing devices or thermostats, and automatic toaster release mechanism are then located in the end compartments separated from the direct heat of the toasting chambers.

This invention relates to an improved toasted construction including a base, formed of a suitable high temperature phenolic, that supports thereon the toaster case and chassis, and further has upstanding integral baffles that close the open ends of the chassis platform to separate the toasting chambers from the defined endward compartments between the case and chassis.

Typical toaster cases, moreover, have been made of a polished chrome finished material where even the inner case face is highly reflective, which being outwardly adjacent the heating elements, redirects much heat back to the toasting chambers. Based on these reflective characteristics, heating elements have been designed and perfected in complimentary combinations so that the opposite sides of the bread are uniformly toasted. However, porcelain finished walls are being used now for decorative restyling of the case and these have duller inner faces. Consequently, heat distribution from these duller walls is significantly different so much so as to create an imbalance as between the standard heating elements where the toasting quality is unacceptable.

This invention also relates to an improved toasted construction that compensates for possible different reflective characteristic of the inner case face by interposing between this face and the heating elements a reflector plate operable thereby to permit a single inventiory of outer and inner heating elements for a toaster regardless of the exterior case construction.

A main object of this invention is to provide a toaster case cinstruction which has integral base and baffles, typically formed of an insulating heat resistant phenolic, which base supports thereon the toaster case and chassis and which baffles serve to isolate the toaster heating chambers from end compartments between the case and chassis.

Another object of this invention is to provide a toaster case construction having reflectors separately mounted on the toaster chassis, outwardly of and opposing the outer heating elements effective to impart a uniform reflective characteristic independently of the adjacent case walls operably thereby to utilize without inventory changes toaster case combinations including polished case walls or lower reflective porcelain case walls.

These and other objects of this invention will be more fully understood and appreciated after revewing the following specifications, the accompanying drawings forming a part thereof, wherein:

FIG. 1 is a perspective view, partially broken away for sake of clarity, of a toaster having a preferred embodiment of the subject invention;

FIG. 2 is a top plan view, again with certain structure removed, of the toaster disclosed in FIG. 1;

FIG. 3 is a sectional view as seen generally from line 3—3 in FIG. 2, except showing the toaster components partially disassembled;

FIG. 4 is a sectional view as seen generally from line 4—4 in FIG. 2;

FIG. 5 is a sectional view of vents in the base as seen generally from line 5—5 in FIG. 2; and FIG. 6 is a sectional view of the reflector-heating element cooperation as seen generally from line 6—6 in FIG. 1.

Referring now to FIG. 1 of the drawing, the illustrated toaster 10 has a base 12 of phenolic or other insulating material supporting thereon a chassis 14 and an overlying case 16. The chassis 14 and case 16 each is of formed sheet metal according to the typical construction and includes slots open to between opposing heating elements 18 that define therebetween toasting chambers 20. A carriage arm 22 projects into each heating chamber through a generally vertical slot 24 in the chassis 14 from a carriage slide 26 supported on rod 28. Coil tension spring 30 biases the carriage 26 to the upper or non-toasting position and an air cylinder snubber 32 smoothes out the return movement of the carriage to this position after the toasting cycle. Actuating lever 34 from the carriage projects through a vertical case slot (not shown) to provide exterior carriage manipulation to begin or manually end the toaster cycle, as desired. A timer hold and release mechanism 36 holds the lowered carriage in the toasting position (not shown) and thereafter automatically releases the carriage after the toasting cycle. Appropriate electrical contacts 38 are also actuated by the carriage movement to complete or break an appropriate electric circuit with the heating elements to energize and deenergize the same at the proper time according to the toasting cycle, and terminals 39 are provided for connection to a conventional power chord 40.

The typical chassis 14 structurally includes a lower metal platform element 42 having a horizontal section 43, spaced vertical sections 44 and lower flanges 45. The flanges 45 rest on the base 12 and are trapped thereagainst by overlapping flanges 46 on the case; metal screws 48 cooperating with the case flanges to hold the components together. The horizontal section 43 of the platform is open under the heating chambers 20 of the chassis 14, except for spaced arms 50 that hold the wire bread guides 51. The chassis further includes an upper metal box-like element 52 having endward vertical sections 54 and an interconnecting horizontal top section 55. The horizontal section 55 has the bread inserting slots therein that line up with the underlying heating chambers 20. Tabs 57 from the upper element 52 cooperate with the lower platform element 42 to hold the elements together as the unitary chassis structure. An insulator sheet 60, typically of mica, is mounted on brackets 61 to the chassis and a continuous nichrome wire 62 is supported on the insulator and connected in the appropriate circuit with the control contacts 38 already mentioned. The wire is wound in a zig-zag manner across one face of the insulator to lie mostly adjacent the heating chamber and define thereby the heating elements 18 as already noted.

The structure thus far described is common in the toaster art where the electric connections 39 and control contacts 38, the toaster hold and release mechanism 36, and the carriage structure 26, 28, 30 and 32 are housed in the end compartments 64 and 65, defined between the chassis 14 and case 16. Underwriter's Laboratory specifications require that these various components be separated from direct exposure with the heating chamber, so that baffles are typically provided across the horizontal and vertical sections of the platform element 42 between the heating chamber and end compartments. Prior to this invention, these baffles have been formed by separate L-shaped components, typically of sheet metal, which were secured by screws, rivets, or the like to the base.

This invention discloses an improvement in this specific area in that, as can be seen clearly in FIG. 1-4, the base 12 is shown as a one-piece structure which has an integral relatively narrow peripheral element or rim 70 on which the chassis 14 and case 16 rest and to which these components are secured. Moreover, the base has integral horizontal interior sections 71 and 72 which extend the width across the base base between opposed sections of the peripheral element or rim. These horizontal sections actually underlie end compartments defined between the chassis 14 and case 16 and close off the lower end of each one of the compartments. At the inward termination of the respective horizontal section 71, 72 and thus at the termination of the respective end compartment, an upstanding baffle 76, 77 is formed which is sized to fit snugly within the vertical and horizontal sections of the platform. The baffles are suitable thereby to close off the open ends of the platform and separate the heating chambers from the end compartments. The baffles extend clear across the platform but also have provided therein the several slots (78 for example) suitable for receiving the electrical conductors which extends across the heating chamber between the particular electrical controls, contacts or the like located in the opposite end compartments.

The toaster has a hinged crumb tray 80 which closed the open base below the heating chamber, and in this regard further, baffle 76 has located thereon adjacent the heating chamber a loop 81 which receives a spring steel clip 82 suitable for retaining the crumb tray in a snapped locked and closed position. As is generally common, the crumb tray 80 is hinged by appropriate means, such as lateral extensions 83 that fit within slots 84 on the toaster chassis vertical section and are held in place therein by the base 12 when the chassis and base are secured together.

Another aspect of this invention is the provision in the horizontal intermediate base sections 71 and 72 of vents 85, 86 suitable for providing air circulation within the end compartments 64 and 65. Each of the vents is formed typically (FIG. 5) of staggered generally parallel sets of spaced ribs 88 and webs 89 defining through openings 90 therebetween. The inner side of the webs are flared away slightly from the adjacent ribs, and the ribs are elevated above the inner side of the base in staggered bridging relation to the openings between the webs. The raised ribs help prevent the vents from being closed accidentally, and moreover provide a zig-zag air path that makes it quite difficult to insert anything such as a knife blade into the toaster through the vent openings.

The one piece base and integral baffles provide for convenient assembly with the toaster chassis and case. The integral baffles and base permit an even more effective separation of the end compartments from the toasting chambers and from the toaster exterior because the barrier is both of a heat and electrical insulating material but moreover would not have any discontinuities except where actually planned and provided. The base can be formed by a compression or transfer-type molding technique in a suitable molding fixtures and under suitable temperature and pressure conditions, as is well known in the art.

Another feature of this invention is the inclusion on the toaster chassis 14 of reflectors 100 which are selectively held in place by screws 102 threaded into openings in the chassis. The reflectors are generally planar in nature and extend in spaced parallel relationship to the insulator 60 and the heating element 18 defined thereon. The reflector 100 has a plurality of protrusions 104 formed thereon which face the heating element and engage the insulator 60 so as to maintain the heating element wire itself 62 separated from the reflector. In this regard, the reflector typically is formed of an aluminum having a brushed finish so that heat is reflected from the outside of the heating element 18 back toward the heating chamber 20.

The particular significance of this reflector 100 and its adaptability to the particular toaster chassis 14 is that achieved, where for styling change only, porcelain-finished sidewall 110 is used as part of the toaster case. This thereby provides a dull poorly reflective inner case surface 112 which is directly contrasted with the highly reflective inner case surface of the long used chrome finished toaster case construction. Consequently, heating elements that have been manufactured for long periods and with great amounts of trial and error gained technical experience no longer prove acceptable for uniformly toasting bread required by commercial standards, even though the only change in toaster construction is the decorative case side wall. The use of these reflectors 100 on the standard toaster chassis 14 in the manner noted provides that even toasters having porcelain-finished side walls toast uniformly according to suitable commercial standards. This permits the manufacture of a full line of toasters, including chrome and/or porcelain-finished case walls, where the toasting characteristics is virtually the same, with a minimum variation in assembly routine and with a minimum variation in inventory of heating element toaster chassis and the like. However, practically and commercially, the reflector need only be used in combination with the porcelain-finished case toasters.

It is thus noted that this invention significantly improves the toaster art in that it reduces the toaster cost and the inventory of parts requirements, and it improves the manner and ease of assembly.

What is claimed is:

1. A toaster combination comprising a base, a chassis on the base, a case overlying the chassis, means securing the base, chassis and case together as a unit, the chassis having opposing insulating sheets each supporting a heating element thereon to define a toasting chamber, a pair of reflectors, and means removably securing the reflectors to the chassis in outwardly spaced generally parallel relation to the insulating sheets and inwardly spaced from the adjacent case wall, the chassis having opposing walls facing the toasting chamber and extended transverse to the insulating sheets, the base having opposing integral portions each extended away from the toasting chamber from the respective chassis wall, baffles formed integrally of opposing base portions and upstanding therefrom aligned with the respective chassis walls generally abutting the respective chassis walls to define end compartments within the case and outwardly of the chassis and separated from the toasting chamber, each of said opposing base portions has a guarded vent therein underlying and communicating with each end compartment, and each vent having sequentially arranged webs and ribs formed integrally of the base at their ends and separated from each other and the base along their sides.

2. A toaster combination comprising a base, a chassis on the base, a case overlying the chassis, means securing the base, chassis and case together as a unit, the chassis having opposing insulating sheets each supporting a heating element thereon to define a toasting chamber, the chassis further having opposing walls facing the toasting chamber and extended transverse to the insulating sheets, and the base having opposing integral portions each extended away from the toasting chamber from the respective chassis wall and baffles formed integrally of the opposing base portions and upstanding therefrom aligned with the respective opposing chassis walls to generally abut the respective chassis walls to define end compartments within the case and outwardly of the chassis and separated from the toasting chamber, the chassis including a platform portion having spaced walls that extend transverse to and beyond the opposing chassis walls toward the base, and each baffle on the base being suitably shaped to fit within and substantially close the opening defined by the respective opposing chassis wall and platform portion walls.

3. A toaster combination according to claim 2, wherein the case wall adjacent and facing each insulating sheet has a porcelain coated finish thereon, and wherein a reflector is removably secured to the chassis in outwardly spaced parallel relation to the insulating sheet and inwardly spaced from the adjacent case wall.

4. A toaster combination having a base, a chassis on the base, a case overlying the chassis, means securing the base, chassis and case together as a unit,
(a) the chassis having a generally flat intermediate wall, side walls projected from opposite edges of the intermediate wall toward the base, end walls projected from the intermediate wall away from the base and extended transverse to the side walls, and spaced heating elements between the end walls generally on the side of the intermediate wall remote from the base and defining therebetween a toasting chamber;
(b) the case having an intermediate wall slotted to be open to the toasting chamber and having pairs of opposed side and end wall extended therefrom in spaced relation to the adjacent chassis heating element and end wall, respectively, toward the base;
(c) the base having spaced substantially flat wall portions each extended generally between the chassis and case end walls, and a baffle integral with each wall portion and upstanding therefrom and shaped generally to fit complementary within and close the opening defined between the chassis intermediate and side walls and the chassis end walls suitable for separating the toasting chamber from end compartments defined between the chassis and case end walls.

5. A toaster combination according to claim 4, wherein the chassis further includes a pair of generally planar reflectors, and means removably securing the reflectors between the chassis end walls in outwardly spaced generally parallel relation to the adjacent heating element and inwardly spaced relation to the adjacent case side wall.

6. A toaster combination according to claim 5, wherein the chassis further includes spaced insulating sheets supported to lie between the chassis end walls and the heating elements are supported on the insulating sheets, and wherein each reflector has a plurality of small protuberances directed toward and abutted with the adjacent insulating sheet to maintain the reflector separated from the heating element on said sheet.

7. A toaster combination according to claim 4, wherein the base is unitary and has narrow elements that extend between and integrally interconnect the flat wall portions while narrow elements also generally underlie the case side walls.

References Cited
UNITED STATES PATENTS

| | | | |
|---|---|---|---|
| 1,522,818 | 1/1925 | Grouleff et al. | 99—389 |
| 2,419,355 | 4/1947 | Koci | 99—401 UX |
| 2,598,592 | 5/1952 | Olson et al. | 99—389 UX |
| 2,725,816 | 12/1955 | Hollister | 99—401 |
| 2,773,441 | 12/1956 | Ireland | 99—391 X |
| 3,169,469 | 2/1965 | Parr | 99—40 X |
| 3,529,538 | 9/1970 | Ottinger | 99—401 X |

DANIEL BLUM, Primary Examiner

U.S. Cl. X.R.

99—400, 401; 220—4 R